United States Patent [19]
Panzer et al.

[11] 3,880,753

[45] Apr. 29, 1975

[54] FLOCCULATION OF SUSPENDED SOLIDS IN AQUEOUS MEDIUM BY ACTION OF CYCLO-1,1-DIALLYLGRIANIDINE POLYMER

[75] Inventors: Hans Peter Panzer, Stamford, Conn.; Louis Vincent McAdams, East Greenwich, R.I.

[73] Assignee: American Cyanamid Company, Stamford, Conn.

[22] Filed: Oct. 1, 1973

[21] Appl. No.: 402,436

Related U.S. Application Data

[62] Division of Ser. No. 107,456, Jan. 18, 1971, Pat. No. 3,790,537.

[52] U.S. Cl. .................................................. 210/54
[51] Int. Cl. .............................................. B01d 21/01
[58] Field of Search .......... 210/54, 10; 260/80.3 N, 260/89.7 N, 72 R; 162/166, 167, 168

[56] References Cited
UNITED STATES PATENTS

| | | | |
|---|---|---|---|
| 2,671,076 | 3/1954 | Price | 260/89.7 N |
| 3,412,019 | 11/1969 | Hoover et al. | 260/89.7 N |
| 3,617,570 | 11/1971 | Redmore | 210/54 |

*Primary Examiner*—S. Leon Bashore
*Assistant Examiner*—William F. Smith
*Attorney, Agent, or Firm*—Evans Kahn

[57] ABSTRACT

Water-soluble polymers are prepared by homopolymerizing 1,1-diallylguanidine or by copolymerizing 1,1-diallylguanidine. The resulting polymers are cationic and are flocculating agents. When glyoxylated (by reaction with glyoxal) they are water-soluble cationic thermosetting wet strength agents for paper. Wet strength paper containing this polymer rapidly loses its wet strength on normal weathering.

6 Claims, No Drawings

FLOCCULATION OF SUSPENDED SOLIDS IN AQUEOUS MEDIUM BY ACTION OF CYCLO-1,1-DIALLYLGRIANIDINE POLYMER

This is a division of application Ser. No. 107,456, filed on Jan. 18, 1971, now U.S. Pat. No. 3,790,537.

The present invention relates to novel water-soluble cationic glyoxalated vinylamide polymers and to paper of improved wet strength resulting from a content thereof. The invention includes processes for the manufacture of the polymers and of the paper, and the flocculation of suspended solids by use of the polymer.

An important advance in polymer chemistry occurred with the discovery of water-soluble cationic vinylamide polymers which carry sufficient glyoxal substituents to be thermosetting. It was found that these polymers possess the important property of imparting excellent wet strength at neutral or alkaline pH values to paper, and that the resulting paper readily could be pulped at a pH above about 9 without need for special equipment or chemicals. A variety of polymers and general methods for their manufacture and for the manufacture of wet strength therefrom are disclosed in Coscia et al., copending application Ser. No. 745,486, now U.S. Pat. No. 3,556,932.

The discoveries have now been made that homopolymerized 1,1-diallylguanidine and its copolymers with acrylamide are substantively adsorbed by cellulose fibers in aqueous suspension at pH values in the range of 4–8 and that, when reacted with sufficient glyoxal to be thermosetting and added to papermaking furnishes having a pH in the range of 4–8, in preferred instances they impart excellent wet strength to the resulting paper. In addition, they are very effective as flocculating agents for solids suspended in aqueous medium and as dewatering agents for digested sewage sludge.

The present invention provides a glyoxalated wet strength resin which need not necessarily contain a carboxamide or sulfonamide component, and which permits the production of paper having superior wet strength per unit weight of wet strength resin present. The invention further permits the manufacture of high wet strength paper at a neutral or alkaline pH, so that corrosion of the machine and acid attack of the felt are minimized, and the paper need not be subject to acid attack on aging. The polymers of the present invention consist essentially of cyclo-1,1-diallylguanidine linkages (or of cyclo-1,1-diallylguanidine and acrylamide linkages). The precise formula of the cyclo-1,1-diallylguanidine linkage has not been established, but the evidence is that it has the configuration

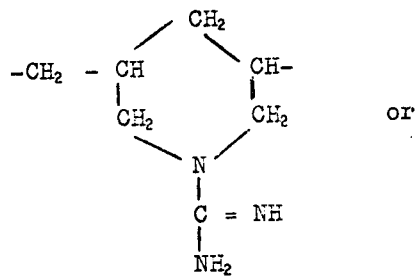   or   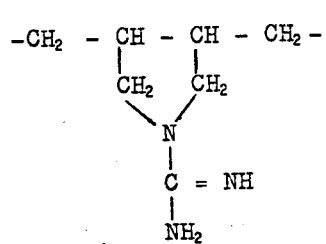

For the sake of brevity and simplicity, the linkage is not designated hereinafter by structural formula but by the term "cyclo-1,1-diallylguanidine."

The acrylamide linkage is generally considered to have the theoretical formula:

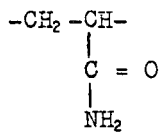

In the polymer, the cyclo-1,1-diallylguanidine linkage is preferably present in minor proportion. A large proportion, in excess of about 40 mol percent based on the acrylamide, appears to confer no advantage and this amount is therefore regarded as the upper practical limit. The efficiency of the polymer decreases sharply when the linkage is present in less than about 2 mol percent, so that this is regarded as the lower practical limit. The linkages therefore preferably fall within the molar ranges of 100:40 and 100:2. Our evidence is that best results are obtained when the ratio is within the range 100:25 to 100:5 and particularly at about the 90:10 molar ratio.

The polymer may and advantageously will contain other linkages than the foregoing, so long as they do not substantially affect the essential character of the polymer. Thus, for example, they may contain methacrylamide linkages, diacetone acrylamide linkages, sulfonyl

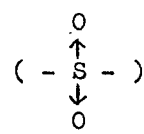

linkages, diallyl dimethyl ammonium chloride linkages, and dimethylaminoethyl acrylate linkages.

The polymers are prepared by any of the standard methods for the polymerization of water-soluble vinyl monomers.

In general, an aqueous solution is formed of the monomer or monomers to be polymerized, and to this is added a vinyl polymerization catalyst. The dissolved molecular oxygen present is then removed by purging the reaction vessel with an inert gas or chemically inactivating the oxygen with sodium sulfite as disclosed and claimed in R. B. Wasser copending application, Ser. No. 762,620, filed Sept. 25, 1968, now U.S. Pat. No. 3,620,991. The mixture is maintained at reaction temperature until it substantially ceases to increase in viscosity, after which the polymer can be recovered in dry form by pouring the product into a large volume of acetone. The polymer precipitates, usually as a powder, and dissolves readily in water. If preferred, the reaction product can be dried on a rotating drum having a temperature of 100°C. The dried product is easily flaked from a stainless steel drum by a scraper blade.

The polymers are effective flocculants for the suspended solids in aqueous medium, for example, raw river water, industrial waste water, and digested sewage sludge. For that purpose, they are advantageously formed into a dilute (e.g. 1%) aqueous solution, and the solution is added to the medium to be clarified at such rate as to cause the suspended particles to clump together. The appropriate amount in any instance can be determined by laboratory test, and is generally in the range of 0.1 to 1,000 parts by weight of the polymer per million parts by weight of suspension to be treated, depending chiefly on the solids content and nature of the dispersed solids. In the case of dilute suspensions, the solids are allowed to settle, leaving a clear aqueous phase.

The polymers are readily rendered thermosetting by reaction with glyoxal. For this purpose, the procedure of our copending application can be followed, by warming a slightly alkaline aqueous solution of the polymer containing the desired amount of glyoxal until the solution has increased in viscosity but is short of the point at which it is no longer pumpable. The amount of glyoxal added is sufficient to render the polymer thermosetting, and a suitable amount can be found by trial. The smallest amount of glyoxal per mol of glyoxal-reactive substituent of the polymer for the purpose is about 0.05 mol, and a much larger amount may be employed, an excess evidently doing no harm. An amount within the ratio range of 0.1:1 to 0.8:1 appears to impart best wet strengthening efficiency to the polymer.

The reason why the glyoxalated cyclo-1,1-diallylguanidine polymers possess superior wet strengthening properties has not been ascertained, but the evidence is that this superiority is ascribable to the fact that at least some of the glyoxal substituents are in close proximity to the cationic nitrogen atoms of the polymer. In the polymer, the

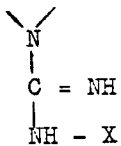

components are the loci of the cationic charges, and the glyoxal substituents are the "X" substituents shown.

The glyoxal substituents have the theoretical formula
—CHOHCHO.

When the polymer is added to an aqueous suspension of cellulose fibers (as occurs in papermaking), the cationic loci of the polymer are deposited upon the anionic loci of the cellulose. As a result, the glyoxal substituents are much more intimately associated with the cellulose molecules of the fibers and have greater opportunity to react with them when the fibers are dried, than is the case when the glyoxal substituents are present on essentially non-ionic polymer linkages.

The polymers of the present invention in thermosetting glyoxalated state can be employed in the manufacture of paper as beater additives. Preferably, they are added as dilute aqueous solutions to the pulp as close to the wire as is practical, for example, at the head box or fan pump. The pH of the pulp as it falls upon the wire should be in the range of about 4–8, and the polymers are rapidly and substantively adsorbed by the fibers.

The minimum and maximum amounts of the polymer which need be present on the fibers to impart useful wet strength has not been ascertained, but from other experience it is probable that these values lie within the range of 0.1 to 5% of the polymer based on the dry weight of the fibers. The range in any instance and the optimum amount within the range in any instance, can be determined by laboratory trial.

The polymer thermosets and develops its wet and dry strength properties when the wet webs are dried. An elevated temperature is not necessary, but if desired, the paper can be dried by passage over drying rolls having surface temperatures in the range of 190°–250°F., as is customary.

The polymer produces its strengthening action in two distinct manners, both resulting from chemical reaction of the glyoxal substituents. It cross-links with itself and thereby forms large polymeric networks. In the second manner, the glyoxal substituents react with the cellulose whereby fiber-polymer-fiber unions are formed.

The paper of the present invention loses about a third of its wet strength when soaked in water at room temperature for 24 hours, and so disintegrates on normal out-of-door weathering more rapidly than paper which possesses permanent wet strength. To this extent it helps solve the litter problem. Industrially, the paper can be pulped by slurrying it in warm water having a pH of about 9. This loosens the polymer linkage sufficiently so that thereafter the paper can be reduced to a pulp by ordinary action of a beater or refiner.

The invention is more particularly illustrated by the examples which follow. These examples are best embodiments of the invention and are not to be construed as limitations thereon.

EXAMPLE 1

The following illustrates the preparation of polycyclo-1,1-diallylguanidine.

In a 500 ml., 3-necked round bottomed flask equipped with a magnetic stirrer, reflux condenser, nitrogen inlet tube, and thermometer are placed 80 g. 1,1-diallylguanidine hydrochloride, 160 g. of dimethyl sulfoxide, and 3.2 g. (4% based on the weight of the diallylguanidine) of ammonium persulfate. The solution is purged with nitrogen to remove oxygen and is heated at 45°–50°C. for 4 days. After cooling to room temperature, the solid mass was digested in isopropanol in a Waring blender, filtered, and dried to give 43.5 g. (55% yield) of poly(1,1-diallylguanidine).hydrochloride. The polymer has an intrinsic viscosity of 0.1, indicative of a molecular weight of about 10,000.

The polymer is added as a 0.1% by weight solution to a laboratory sample of turbid river water at pH in amount sufficient to supply 0.5 p.p.m. of the polymer on the total weight of the sample. The mixture is stirred gently to distribute the polymer throughout the sample. The suspended solids flocculate rapidly.

1,1-Diallylguanidine and its salts are claimed in copending application Ser. No. 107,406 filed herewith by F. C. Schaefer and A. C. Wright now U.S. Pat. No. 3,734,939, which also discloses methods for their preparation.

EXAMPLE 2

The following illustrates the conversion of poly-(1,1-diallylguanidine) to thermosetting state by reaction with glyoxal.

Into a 100 ml. beaker equipped with a mechanical stirrer are placed 10 g. (0.0569 mol) of poly(1,1-diallylguanidine).hydrochloride, 30 g. of water, and 6.2 g. (0.427 mol) of 40% aqueous glyoxal. The pH of the solution is adjusted to 8.0 and enough water is added to give a total weight of 57 g. The solution is stirred for 2 hours, diluted to 10% solids and adjusted to pH 3.5.

It remains at pumpable viscosity for at least a week at room temperature.

EXAMPLE 3

The following illustrates the preparation of a water-soluble cationic 90:10 molar ratio acrylamide:1,1-diallylguanidine copolymer, and the effectiveness of the polymer as dewatering agent for digested sewage sludge.

In a two-liter, 3-necked round-bottomed flask equipped with a mechanical stirrer, thermometer, reflux condenser, and two dropping funnels are placed 96.8 g. (0.486 ml.) of 1,1-diallylguanidine acetate, 356 g. of water and 163 g. of isopropanol. The solution is heated to reflux and to it are added with stirring over 1.5 hours, a solution of 311 g. (4.375 ml.) of acrylamide in 349 g. of water and a solution of 1.9 g. (0.47% based on the weight of the guanidine) of ammonium persulfate in 180 g. of water. Reflux is continued for 2 hours, after which the solution is cooled, and 40.38 g. of sodium dihydrogen phosphate monohydrate are added.

The polymer solution is added with stirring to digested sewage sludge at such rate to supply 700 p.p.m. of the polymer on the liquid weight of the sludge. Flocculation of the solids occurs promptly and a supernatant water layer forms.

EXAMPLE 4

The following illustrates the preparation of a polymer composed of acrylamide and cyclo-1,1-diallylguanidine linkages in 100:25 molar ratio. The polymer is prepared as the acetate.

Into 500 ml. round-bottomed, stoppered flask equipped with thermometer, stirrer, nitrogen gas inlet tube, condenser, and three addition funnels are added 12.0 g. (0.0603 mol) of diallylguanidine acetate and 47 g. of water. The pH of the solution is adjusted to 2.5 with 40% sulfuric acid. In the first addition funnel is placed 17.1 g. of acrylamide (0.2412 mol) and 60 g. of water. Into the second funnel is placed 0.03 g. of ammonium persulfate in 48 g. water. In the last funnel is placed 0.015 g. of potassium metabisulfate in 48 g. of water.

The solution is swept with nitrogen to remove dissolved molecular oxygen and heated to 40°C. The contents of the three addition funnels are added semi-continuously as eight equal charges over one hour. Heating is continued at 40°C. for four more hours under nitrogen.

The reaction product is poured into a volume of ethanol, and the polymer precipitates as a white powder having an intrinsic viscosity of 2.04.

The polymer is soluble in water and is a very satisfactory flocculant for the suspended solids in sewage.

The polymer glyoxalates to thermosetting state when 0.5 mol of glyoxal (based on the combined number of acrylamide and cyclo-1,1-diallylguanidine linkages therein) is added to a 15% by weight aqueous solution of the polymer and the solution is allowed to stand for two hours at pH 8 and 30°C.

A sheet of water-leaf paper (filter paper) is impregnated with the above solution diluted to 0.5% polymer solids (assuming 50% reaction of the glyoxal) and adjusted to pH 6. When air dried at 20°C. the paper possesses excellent wet and dry strength. It possesses similar strength when dried for 2 minutes on a laboratory drum drier having a drum temperature of 230°F.

EXAMPLE 5

The following illustrates the conversion of a 90:10 molar ratio acrylamide:1,1-diallylguanidine polymer to thermosetting state by reaction with glyoxal.

To 150 g. portion of an aqueous isopropanol solution of a 90:10 molar ratio acrylamide:1,1-diallylguanidine copolymer prepared according to Example 3, is added 250 g. of water and 49.32 g. of 40% aqueous glyoxal. The pH of the solution is adjusted from 5.5 to 8.0. Water is added to bring the weight of the solution to 553.8 g. After 1.25 hours at 30°C. the pH of the solution has dropped to 7.6, and is readjusted to 8.0. After 2.25 hours, the solution is very viscous and 50 g. of deionized water is added, and the pH is lowered to 3.5, and additional water is then added to increase the weight of the solution to 761.5 g. (8% concentration of polymer and glyoxal). The solution is stable at 25°C. for more than 2 weeks.

EXAMPLE 6

The following illustrates the different method for the homopolymerization of 1,1-diallylguanidine.

To 5.0 g. of 1,1-diallylguanidine hydrochloride dissolved in 7.0 ml. of water in a vessel provided with nitrogen gas purge is added one drop of t-butyl hydroperoxide and the contents are purged with nitrogen until all oxygen has been removed. The tube is allowed to stand for 24 hours at 20°C., 24 hours at 50°C. and 75°C. for 24 hours. The polymer precipitates when the contents are poured into anhydrous acetone. The resulting white powder dissolves readily in water at room temperature.

The polymer solution is diluted to 1% solids in water and is subjected to standard laboratory test to determine its effectiveness as a flocculant for the suspended solids in a sample of turbid water. It causes very satisfactory flocculation of the solids when added at the rate of 0.5 p.p.m. based on the weight of the water sample.

EXAMPLE 7

Into 100 cc. of water is stirred 13.9 g. (0.1 mol) of poly-1,1-diallylguanidine hydrochloride and 2.9 g. (0.05 mol) of glyoxal as a 40% aqueous solution. The solution is allowed to stand for 2 hours at pH 8 and 30°C.

To an aqueous suspension of well-beaten papermaking bleached hardwood:bleached softwood fibers at a consistency of 0.6% and a pH of 7.5 is added sufficient of the glyoxalated poly-1,1-diallylguanidine solution to provide 0.25% by weight of the polymer based on the dry weight of the fibers, assuming that 50% of the added glyoxal has reacted with the guanidine residues in the polymer. The suspension is gently stirred for a few moments to permit the fiber to adsorb the polymer after which the suspension is formed into handsheets at a basis weight of 50 lb. per 25 inches × 40 inches/500 ream and dried for one minute on a rotary drum dryer having a drum temperature of 240°F.

The resulting paper possesses very satisfactory wet strength.

EXAMPLE 8

The following illustrates the effect of changes in the acrylamide:cyclo-1,1-diallylguanidine molar ratio in the polymer, and the amount of wet strength which is lost when the final paper is soaked in water for a few hours.

The procedure of Example 1 is repeated except that in each instance the polymers have the molar ratio shown in the table below and in each instance the amount of glyoxal added to render the polymer thermosetting is 0.77 mol per mol of acrylamide linkages in the polymer.

Results are as follows:

| Run | Polymer Molar Ratio[1] | % Added[2] | Wet Tensile Lb./in. Int. | After 18 Hours[3] | % Loss After 18 Hours[3] |
|---|---|---|---|---|---|
| 1 | 100:18 | | 4.2 | 2.4 | 43 |
| 2 | 100:7.6 | 0.25 | 4.0 | 2.2 | 45 |
| 3 | 100:5.3 | | 4.6 | 2.8 | 39 |
| 4 | 100:18 | | 5.45 | 3.3 | 39 |
| 5 | 100:7.6 | 0.50 | 6.0 | 3.3 | 43 |
| 6 | 100:5.3 | | 6.9 | 4.5 | 35 |

[1] Acrylamide:cyclo-1,1-diallylguanidine
[2] Based on dry weight of fibers
[3] In water at room temperature The results show that the polymer is comparatively insensitive to changes in molar ratio, and that a major decrease in wet strength occurs when the paper is merely soaked in water for a few hours.

EXAMPLE 9

The following illustrates the preparation and properties of a polymer formed of the polymer which consists essentially of acrylamide, diacetone acrylamide and cyclo-1,1-diallylguanidine linkages in 80:10:10 molar ratio with and without a reacted content of glyoxal. The procedure of Example 3 is repeated except that the acrylamide is decreased to 80 mol percent and is replaced by an equivalent amount of diacetone acrylamide. A similar polymer is obtained.

EXAMPLE 10

The following illustrates the preparation and properties of a polymer consisting essentially of sulfo and cyclo-1,1-diallylguanidine linkages in about 50:50 molar ratio.

To a three-necked, 100-ml. round-bottomed flask equipped with a solid carbon dioxide condenser, thermometer, dropping funnel and stirrer is charged a solution of 11.5 (0.18 mol) of $SO_2$ in 15 ml. of methanol and 12.3 g. (0.05 mol) of 1,1-diallylguanidine hydrochloride in methanol. The mixture is stirred at 22°C. and 1 g. of t-butylhydroperoxide in 8 ml. of methanol is added dropwise over 25 minutes. The reaction mixture is maintained at 20°–22°C. for 2.5 hours and is then filtered. The fine, white solid is washed repeatedly with absolute methanol at 30°C. Yield 2.2 g., 18%. The copolymer is water-soluble.

The product is an excellent flocculant for the solids in turbid river water and in chlorinated river water.

EXAMPLE 11

The following illustrates the preparation and properties of a polymer consisting essentially of acrylamide, cyclo-diallyl dimethyl ammonium chloride and cyclo-1,1-diallylguanidine linkages in 90:5:5 molar ratio, and said polymer having a reacted content of sufficient glyoxal to be thermosetting.

The procedure of Example 3 is repeated, except that half of the 1,1-diallylguanidine is replaced by an equivalent amount of diallyl dimethyl ammonium chloride. A similar polymer is obtained.

Paper composed of water-laid cellulose fibers bonded together by a content of polymers according to the present invention is claimed in our copending application Ser. No. 402,437 filed herewith.

We claim:

1. A process for the flocculation of suspended solids in aqueous medium, which comprises distributing through said medium an effective amount therefor of a water-soluble cationic polymer consisting essentially of cyclo-1,1-diallylguanidine linkages substantially formed by free radical homopolymerization of 1,1-diallylguanidine.

2. A process according to claim 1 wherein the suspended solids are the solids in turbid river water.

3. A process according to claim 2 wherein the polymer is supplied at the rate of 0.5 parts by weight of the polymer per million parts on the total weight of the water.

4. A process according to claim 1 wherein the suspended solids are digested sewage sludge solids.

5. A process according to claim 4 wherein the polymer is supplied at the rate of 700 parts by weight of the polymer per million parts on the weight of said solids.

6. A process for the flocculation of suspended solids in aqueous medium, which comprises distributing through said medium an effective amount therefor of a polymer consisting essentially of acrylamide and cyclo-1,1-diallylguanidine linkages in molar ratio between 100:40 and 100:2 substantially formed by free radical polymerization of acrylamide and 1,1-diallylguanidine.

* * * * *

UNITED STATES PATENT OFFICE
CERTIFICATE OF CORRECTION

Patent No. 3,880,753          Dated April 29, 1975

Inventor(s) HANS PETER PANZER et al.

It is certified that error appears in the above-identified patent and that said Letters Patent are hereby corrected as shown below:

In the title, line 3. Change "1-DIALLYLGRIANIDINE" to
-- 1-DIALLYLGUANIDINE --.

Signed and Sealed this nineteenth Day of August 1975

[SEAL]

Attest:

RUTH C. MASON
Attesting Officer

C. MARSHALL DANN
Commissioner of Patents and Trademarks